Patented Jan. 27, 1942

2,271,350

UNITED STATES PATENT OFFICE 2,271,350

COMPOSITION OF MATTER FOR USE AS AN INSECTICIDE

Lloyd E. Smith and Herbert L. J. Haller, Washington, D. C.; dedicated to the free use of the Public in the territory of the United States of America No Drawing. Application June 17, 1941, Serial No. 398,444

5 Claims. (Cl. 167—24)

(Granted under the act of March 3, 1883, as amended April 30, 1928; 370 O. G. 757)

This application is made under the act of March 3, 1883, as amended by the act of April 30, 1928, and the invention herein described and claimed, if patented, may be manufactured and used by or for the Government of the United States of America for governmental purposes without the payment to us of any royalty thereon.

We hereby dedicate the invention herein described to the free use of the public in the territory of the United States of America to take effect upon the granting of a patent to us.

This is a continuation in part of our copending application for patent, filed December 3, 1938, Serial No. 243,754.

Our invention relates to insecticidal spray preparations with particular reference to hydrocarbon oil sprays and the inclusion therein of organic toxicants.

Of the various organic toxicants which have been used in spray preparations, one, an organic compound known as rotenone, has been found to be very beneficial and effective in the control of certain parasites. However, this compound, in its commercial form, which is substantially pure, also has been found to be quite insoluble in both hydrocarbon oils and water, and, accordingly, when added to an oil and water spray emulsion, continuous agitation is necessary to prevent the precipitation of the rotenone. In the present invention, a treatment for rotenone has been developed which renders commercial rotenone soluble in hydrocarbon oil, whereby it can be added to the oil initially along with an oil soluble emulsion prior to shipment and use in the field where the oil is generally emulsified with water for spraying. Also, after this treatment, the oil solution may be used directly for the control of certain insects, such as the common housefly.

An added feature of this treatment resides in the fact that the rotenone is left insoluble in water, and, consequently, the entire proportion of the toxicant remains in the oil phase when emulsified with water and sprayed and, therefore, remains in the oil phase on plant structures after the emulsion is broken.

Another object of the present invention is to provide an oil soluble toxicant of the character mentioned, which, in addition to its parasiticidal action, will effectively retard the penetration of the hydrocarbon oil into the vascular system of plants and hold such oil directly at the surface of the plant tissues, where the most effective attack on the parasites is accomplished.

The following description will fully disclose this invention relative to its preferred forms and other objects and advantages thereof will be apparent. It is to be understood, however, that this invention is not limited to this description but includes variations within the spirit of the invention and scope of the appended claims.

In the Journal of the American Chemical Society, vol. 59, p. 2694-5 (1937), there appears an article by Howard A. Jones and Solomon Love in which it is recorded that the solubility of rotenone at 25° is 0.01 g. per 100 g. of kerosene (fly spray base) D. O. 776. We have found that by heating commercially pure rotenone with certain oils there is obtained a reaction product which not only retains the toxic property of the rotenone, but also the solubility of the rotenone in hydrocarbon or petroleum oil is greatly increased. Normally less than 0.01% of rotenone can be dissolved in such oils. However, by the method of this invention from above 0.01% to 0.3% of rotenone can be dissolved in these oils.

In general, this invention comprises heating substantially pure rotenone with a fatty oil at a temperature and for a time sufficient to dissolve the rotenone in the fatty oil. For example, approximately 0.2 to 0.3 g. of rotenone can be dissolved in 10 g. of a fatty oil by heating them together at a temperature of 160° to 170° C. for 10 to 15 minutes in an open vessel. The solution, while hot, is then poured into the hydrocarbon or petroleum oil. In the example mentioned above, 90 g. of the hydrocarbon or petroleum oil would be a suitable amount. The fatty oil used should be one which is normally soluble in the hydrocarbon or petroleum oil in the proportions used. If an excess of rotenone is used, it will precipitate when the fatty oil solution is added to the hydrocarbon or petroleum oil, and this excess may be removed by any suitable means, such as filtration, decantation, etc. The remaining solution is recovered. In the above example the rotenone content of the resulting solution would be from 25 to 30 times that of a normally saturated hydrocarbon or petroleum oil solution. Suitable hydrocarbon oils for use in this method are those containing kerosene, preferably a fraction thereof boiling between about 350° to 500° F. Suitable fatty oils for use with kerosene are soybean oil, linseed oil, fish oil, peanut oil, corn oil, palm oil, tung oil, sesame oil, etc. Many other fatty oils are also suitable.

We have found that the method of this invention not only results in markedly increasing the dissolved rotenone content of the resulting hydrocarbon or petroleum oil solution, but that this solution is extremely stable. For example, we have found that 0.27 g. of rotenone plus 10 g. of soybean oil remains in solution in 90 g. of a hydrocarbon oil boiling between 370° and 490° F. at room temperature, after standing for one month. The same effect was observed with 3/10 g. of rotenone plus 10 g. of linseed oil dissolved in 90 g. of the hydrocarbon oil. As a further example, the same effect was observed when 0.29 g. of rotenone plus 10 g. of fish oil were dissolved in 90 g. of the same hydrocarbon oil, in accordance with this invention.

This particular oil involved, in addition to functioning as an intermediate solvent for rotenone and hydrocarbon oil, has the important effect, in many instances, of retarding the penetration of the hydrocarbon oil into the plant system. The phenomenon is possibly due to the oxidation of the particular oil involved when sprayed and exposed to air, and to the holding effect on the hydrocarbon oil, due to the thickening of the fatty oil, as a result of which the hydrocarbon oil is retained on the surface of the plant where a direct attack on the parasites is effected. This is particularly true of those animal and vegetable oils classed as drying or semi-drying oils.

Having thus described our invention, we claim:

1. The method of dissolving from above 0.01% to about 0.3% of rotenone in a petroleum spray oil, consisting of heating in an open vessel substantially pure rotenone with a fatty oil which is soluble in the petroleum spray oil at a temperature and for a length of time sufficient to dissolve the rotenone in the fatty oil, thence adding the resulting liquid solution, while hot, to the petroleum spray oil.

2. The method of dissolving from above 0.01% to about 0.3% of rotenone in petroleum spray oil, consisting of heating in an open vessel substantially pure rotenone with a fatty oil which is soluble in the petroleum spray oil at a temperature of 160° to 170° C. for 10 to 15 minutes, thence adding the resulting liquid solution, while hot, to the petroleum spray oil.

3. The method of dissolving from above 0.01% to about 0.3% of rotenone in kerosene, consisting of heating in an open vessel substantially pure rotenone with a fatty oil which is soluble in the kerosene at a temperature and for a length of time sufficient to dissolve the rotenone in the fatty oil, thence adding the resulting liquid solution, while hot, to the kerosene.

4. The method of dissolving from above 0.01% to about 0.3% of rotenone in a petroleum spray oil, consisting of heating in an open vessel substantially pure rotenone with a fatty oil which is soluble in the petroleum spray oil at a temperature and for a length of time sufficient to dissolve the rotenone in the fatty oil; thence adding the resulting liquid solution, while hot, to the petroleum spray oil; thence separating and removing any excess of rotenone precipitant and recovering the resulting rotenone solution.

5. The method of dissolving from 0.01% to about 0.3% of rotenone in a petroleum spray oil, consisting of heating in an open vessel from above 0.01% to about 0.3% of a part of substantially pure rotenone with about 10 parts of a fatty oil which is soluble in the petroleum spray oil at a temperature of 160° to 170° C. for 10 to 15 minutes, thence adding the resulting liquid solution, while hot, to approximately 90 parts of the petroleum spray oil.

LLOYD E. SMITH.
HERBERT L. J. HALLER.